Dec. 10, 1935. L. B. KIMBALL 2,023,892
METHOD OF ELIMINATING KNOCKING IN INTERNAL COMBUSTION ENGINES
Original Filed Dec. 2, 1932
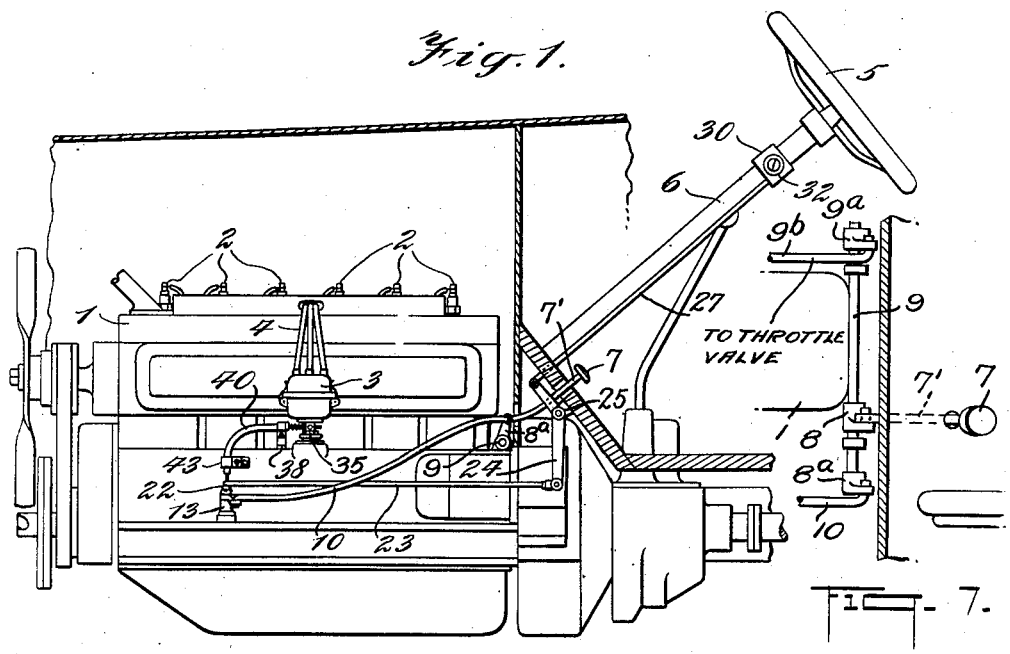
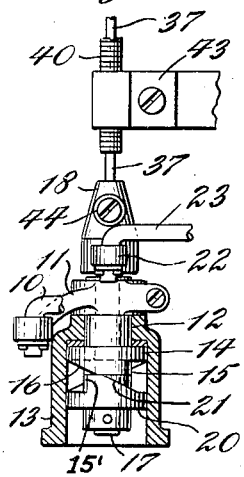
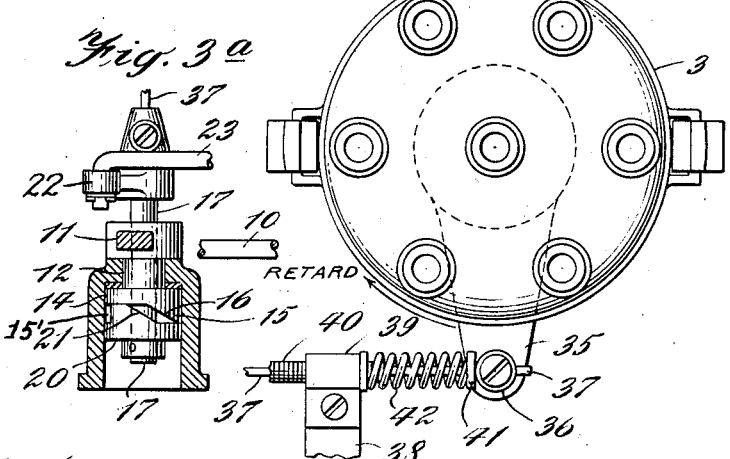
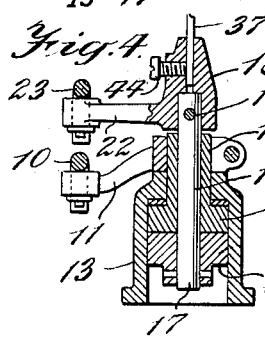
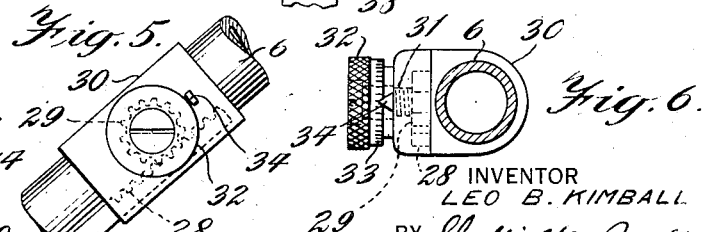
INVENTOR
LEO B. KIMBALL
BY Sheffield & Betts
HIS ATTORNEYS.

Patented Dec. 10, 1935

2,023,892

UNITED STATES PATENT OFFICE 2,023,892

METHOD OF ELIMINATING KNOCKING IN INTERNAL COMBUSTION ENGINES

Leo B. Kimball, New Haven, Conn., assignor to Fuel Development Corporation, a corporation of Delaware Original application December 2, 1932, Serial No. 645,337. Divided and this application January 18, 1934, Serial No. 707,081

2 Claims. (Cl. 123—98)

This invention relates to certain improvements to be applied to internal combustion engines of the explosive type, in which knocking is often produced for example, when an automobile is traveling at high speed or traveling up steep grades and under other conditions which require the development of considerable power by the engine.

This application is a division of my prior application, Serial No. 645,337, filed December 2, 1932. This invention relates particularly to the method of controlling the points of occurrence of the ignition spark or timing as determined by the angular positions of the contact points of the "distributor" forming a part of the electrical system of an automobile engine.

It has been found that the timing of the spark—that is, whether the occurrence of the ignition spark is retarded or advanced—has a very appreciable effect upon detonation or knocking in an automobile engine.

In the present day automobile construction, the spark control, which effects the advance or retardation of the spark, is usually produced automatically by governors installed when the engine is assembled. The usual spark controls produce an advance of the points of ignition of the charge in relation to the speed of the engine. It approximates the optimum position for maximum output and economy under best conditions if and when the throttle valve is wide open. This has also been accomplished manually. Such means are not sufficient to produce anti-knock or anti-detonating conditions in the engine at all times, because of the fact that differences in atmospheric pressure, temperature and moisture content, in fuels and in engine conditions constantly occur. These all have very marked effect upon the amount of knocking or detonation produced by the ignition of the charge in the cylinders.

It is a main feature of this part of my invention to provide a procedure whereby the point of production of the ignition spark may be determined in accordance with the power demanded of the engine, and determined in accordance with the operation of the accelerator or throttle valve controlling devices. This may be independent of or in combination with the action of automatic spark control above referred to. For this purpose, I have provided connections with the throttle valve or power control devices of the engine as indicated in my aforesaid application, so that the point of ignition is adjusted in relation to the power demanded of the engine, to eliminate knocking, regardless of the speed, when under such abnormal conditions as may exist.

For a detailed description of one form of my invention for carrying out the method described herein and which is at present deemed preferable, reference may be had to the following specification and to the accompanying drawing forming a part thereof, in which:

Fig. 1 is a side view in elevation shown partly in section, of an automobile engine having the improved apparatus applied thereto;

Fig. 2 is a plan view of the top of a usual form of distributor for a six-cylinder engine;

Fig. 3 is a side elevation, partly in section, of the device constituting part of my invention for varying and controlling the distributor so that the spark may be retarded or advanced, the positions shown being for maximum retardation of the spark when the throttle valve is opened.

Fig. 3ª is a view similar to Fig. 3 but showing the inclined cams in position for no retardation of the spark or points of ignition;

Fig. 4 is a vertical sectional view of the device illustrated in Fig. 3 but taken at a right angle thereto;

Fig. 5 shows a side elevation of a portion of the manual control that may be attached to the steering post of an automobile so that the spark or ignition control may be easily operated by the driver; and Fig. 6 is a plan view of the upper end of the controlling device on the steering post, and indicates the means for determining the amount of manual displacement of the spark retarding or advancing device.

Fig. 7 is a plan view of the means for connecting applicant's improved spark control with the throttle valve.

Referring to the drawing, the numeral 1 indicates the casting or block containing the cylinders of an automobile engine and on which are mounted the spark plugs 2, and adjacent to which the distributor 3 is also mounted, the distributor having the usual conductors 4 passing therefrom to the spark plugs 2. The numeral 5 indicates the steering wheel of an automobile, and 6 the steering post or casing for the steering shaft. The numeral 7 indicates the usual "accelerator" button or device for controlling the throttle valve of the engine by the foot of the driver. This is usually provided in addition to the manual control (not shown) of the throttle valve from the steering post as is well understood in the art. The support 7' for the button 7 extends to and engages a crank arm 8 which is fixed to a transverse shaft 9 (Fig. 7). The shaft 9 also has fixed thereon a crank arm 9ª provided with the usual rod 9ᵇ, which connects with any preferred form of throttle valve (not shown). A third crank arm 8ª is fixed to the shaft 9, as shown in Fig. 7, and pivoted thereon is one end of a rod 10. The latter is also pivoted at its forward end to a crank arm 11 which is fixed adjustably upon one end of a sleeve 12 that is within the casing 13 containing the cams, for determining the position of the distributor which controls the retardation or advance of the spark.

The lower end of the sleeve 12 is provided with a flanged portion 14, and projecting from the lower surface thereof are diametrically disposed concentric arcuate projections 15. Said projections each have inclined surfaces 16 at diametrically opposite points. A shaft 17 passes through the sleeve 12, and its upper end enters a cap 18 which is pinned or otherwise fastened to said shaft, as indicated at 19. To the lower end of the shaft 17 there is fixed a flanged member 20, having arcuate projections 15' similar to the projections 15 on the flange 14 above mentioned, and having inclined surfaces 21 corresponding in angle to the inclined surfaces 16 on the flanged member 14, as indicated in Fig. 3.

The cap 18 is provided with an arm 22 to the outer end of which a rod 23 is pivoted. The opposite end of said rod 23 is pivotally connected with a bell crank lever 24, which has a fulcrum 25 and a projecting arm 26. The outer end of the arm 26 is pivotally connected with a rod 27 extending upward along the surface of the steering post 6. The upper end of said rod 27 is provided with teeth in the form of a gear-rack 28 and said rack engages a pinion 29. Said pinion is carried within a casing 30 attached to the steering post 6, as indicated in Figs. 5 and 6.

The gear 29 is fixed to a rotatable stud 31, the outer end of which is provided with a cap or thumb nut 32. The surface of said cap or thumb nut may be provided with a series of transverse lines or marks forming a scale 33, or other means may be used to locate its angular displacement. When the scale is used it may cooperate with a pointer 34 projecting from a fixed part of the casing 30.

The distributor 3 is provided with a laterally projecting arm 35. Said arm carries a screw or bolt 36 which engages a flexible member or wire 37 to hold it pivotally in position on said arm.

The numeral 38 indicates a suitable bracket attached to a fixed part of the engine block, and the upper end thereof is provided with a tubular clamp 39 which receives and fixes one end of a flexible tube 40. Between the clamp 39 and a flange or washer 41, adjacent the screw 36, there is placed a helical compression spring 42. It will thus be appreciated that the spring 42 tends to force the arm 35 and the screw or bolt 36 toward the right. The flexible wire 37 extends through the tube 40, the lower end of the latter being also retained in position by a bracket 43 similar to the bracket 38. The said flexible wire projects from said tube 40, as indicated in Fig. 3, and is fixed within the top of the cap 18 by the set-screw 44, as indicated in Fig. 4.

It will now be seen that the angular position of the flange 20 within the casing 13 and the position of the inclined surfaces 21 carried thereon will be determined by the position of the thumb nut 32 on the steering post 6, since the said thumb nut is connected with the crank arm 22, by the rod 27, bell crank lever 24, with the rod 23, which determines the position of the arm 22, the shaft 17, and the flange 20.

The throttle valve control or accelerator button 7 being carried on the crank-arm 8, which oscillates the rod 10 connected with the crank arm 11, the sleeve 12 will be oscillated thereby so that the flange 14 and the arcuate projections 15 will be oscillated angularly and be caused to assume various positions.

As will be understood by one skilled in the setting of timing mechanism for internal combustion engines such as automobile engines, the advance of the spark contact by the distributor is so arranged that the contact is made at a point several degrees, during the motion of the crank arm of the engine crank shaft, in advance of its reaching the top dead center position or point of maximum compression. This is for the purpose of allowing the lag in the flame propagation, etc., to complete the combustion of the compressed gases so that the maximum pressure of combustion will occur at or immediately after the point of greatest compression or top dead center position. The usual automatic spark control device connected with the timing mechanism is often so arranged that the spark is advanced to a considerable extent as the speed of the engine increases. In fact, in some makes of automobile engines, this advance per cylinder as to the ignition point is made at an angle as high as 50 or 60 degrees prior to the position of the crank arm and piston reaching their top dead center or position of maximum compression. This is because of the fact that, although the speed of the engine increases, the rate of combustion and flame propagation within the engine is nearly constant and therefore does not correspondingly increase. Hence, in order to bring about complete combustion at the right time, the spark must be automatically advanced. This advance in the spark often, in some types of engines and particularly when a low grade of gasoline is used or there has been considerable carbon deposit, produces knocking or detonation.

It is, therefore, one of the objects of this invention to eliminate the disadvantages of knocking, without changing the fuel economy over those ranges or sections of the throttle valve opening during which detonation does not occur. This result may be produced without affecting the action of the automatic spark control that acts according to the speed of the engine, when the latter is employed.

As shown in Fig. 3, the arcuate projections forming inclined cams carried by the flanges 14 and 20, respectively, are in such positions that the inclined portions thereof are at the limit of their actions and the inclined surfaces of the said arcuate projections are just out of contact.

Now, assuming that the cams are in the relative positions indicated in Fig. 3ª and that the thumb nut or head 32 has not been moved, and that the automobile is being run at a moderate speed on a highway, and some knocking takes place in the engine, the thumb nut 32 may then be rotated in a clockwise direction (Figs. 1 and 5) so that the rack 28 will be moved downward to pull the rod 23 toward the right. This will swing the arm 22 toward the right (Fig. 3ª) and rotate the flange 20 and the arcuate projections 15' in a corresponding direction to cause the inclined surfaces, 21, on the flange 20 to contact with and then slide downward on the corresponding inclined surface 16 carried by the flange 14, thereby causing said flange 20, the shaft 17, the cap 18, and the flexible wire 37, to move downward. This will cause the arm 35 in Fig. 2 to be forced toward the left, thereby slightly rotating the contact points of the distributor in the same direction. This has the effect of retarding the spark so that the ignition of the compressed fuel is somewhat delayed, to prevent the complete combustion taking place until after the crank on the crank shaft has passed its top dead center position or the point of maximum compression over that range of power variations at which knocking occurs.

It will thus be seen that the operation of the thumb nut or head 32 has retarded the spark over a predetermined range of power output, and therefore, if under prior conditions the engine has been knocking, the knocking will be eliminated.

It is often necessary to supply more fuel to the engine, particularly when an automobile is ascending comparatively steep grades or hills. This may cause the knocking to develop again in the engine on account of the increased effort required, and the greater quantity of fuel used. Since the flange 14 and the arcuate projections 15, carried thereby, are connected with the throttle valve control or accelerator button 7, said flange and the projections thereon will be moved when the accelerator is depressed to produce more power.

Thus it will be seen, from an inspection of Figs. 1 and 3a, that when the accelerator button 7 is depressed, the rod 10 and the crank arm 11 will be moved toward the left, which will cause the arcuate projections 15 carried on the flange 14 to be moved in the same direction. This, after a certain preliminary movement, will again cause the inclined surfaces 16 and 21 of the arcuate projections 15 and 15', respectively, to slide upon each other and draw downward the shaft 17 by a further amount which increases as the throttle valve is opened. In a similar manner as above described, this will cause the cap 18 and the shaft 17 to move downward a correspondingly greater amount. This motion of the wire 37 will then move the arm 35 further toward the left, thus moving the spark contact points of the distributor toward the left and still further retarding the point of ignition until the maximum point of retardation is reached as shown in Fig. 3. The reverse motions of the parts above referred to will serve to advance the spark timing.

The movement of the accelerator button, without any further attention of the operator, will consequently and automatically prevent knocking of the engine even under heavy loads when an automobile is going uphill or traveling at high speed, and at other loads on the engine will prevent knocking if it tends to occur, due to bad engine conditions or poor fuel.

The method above described, as well as the apparatus for carrying out the same, enables the operator of an automobile or other device requiring power and in which an internal combustion engine is used, to cause the engine to function with a maximum advance of the timing or spark ignition consistent with the characteristics of the fuel and the condition of the engine. This means that the engine can always be operated at its maximum efficiency under existing conditions without the presence of detonation or knocking.

It will thus be apparent that the knock-preventing mechanism depends upon two factors: First, the setting of the distributor points in such angular positions that knocking is eliminated at substantially all speeds, and second, an additional control or timing of the distributor points when greater output is demanded, and the throttle valve opening is increased.

I do not wish to be understood as being limited to the use of the various details of procedure described in connection with this embodiment of my invention, since the present application relates to the acts and operations employed in the necessary setting of the spark control devices to eliminate knocking at high speeds or when greater power is required of the engine, and combining therewith the setting of the control of the distributor to fix the range over which the first settings shall take place.

What I claim and desire to protect by Letters Patent, is:

1. The method of controlling the advance and retardation of the spark ignition in internal combustion engines, which comprises, varying the times of ignition concurrently with various degrees of throttle valve opening, and in addition thereto, manually producing certain amounts of retardations of the first mentioned times of ignition over limited sections of the range of throttle valve openings, to eliminate knocking which would otherwise occur because of poor grades of fuel being used or bad conditions in the combustion chambers of the engine.

2. The method of controlling the advance and retardation of the spark ignition in internal combustion engines, which comprises, retarding the times of ignition concurrently with the increased degrees of throttle valve opening, and in addition thereto, manually increasing the retardations of the first mentioned times of ignition over a predetermined portion of the range of throttle valve openings, to eliminate knocking which would otherwise occur because of poor grades of fuel being used or bad conditions in the combustion chambers of the engine.

LEO B. KIMBALL.